(12) United States Patent
Fang et al.

(10) Patent No.: US 12,375,970 B2
(45) Date of Patent: Jul. 29, 2025

(54) QUALITY OF SERVICE IMPLEMENTATIONS FOR SEPARATING USER PLANE

(71) Applicant: ZTE Corporation, Guangdong (CN)

(72) Inventors: Jianmin Fang, Shenzhen (CN); He Huang, Shenzhen (CN); Yin Gao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 126 days.

(21) Appl. No.: 18/458,855

(22) Filed: Aug. 30, 2023

(65) Prior Publication Data
US 2023/0413103 A1 Dec. 21, 2023

Related U.S. Application Data

(60) Continuation of application No. 17/474,494, filed on Sep. 14, 2021, now Pat. No. 11,785,496, which is a division of application No. 16/783,114, filed on Feb. 5, 2020, now Pat. No. 11,146,984, and a continuation of application No. PCT/CN2017/096609, filed on Aug. 9, 2017.

(51) Int. Cl.
H04W 12/06 (2021.01)
H04W 28/02 (2009.01)

(52) U.S. Cl.
CPC ... *H04W 28/0263* (2013.01); *H04W 28/0268* (2013.01)

(58) Field of Classification Search
CPC ............. H04W 28/0268; H04W 12/06; H04W 28/0263; H04W 28/0252; H04W 28/10; H04W 72/087; H04W 28/02; H04W 28/24; H04W 72/04; H04W 72/08

USPC .......................................................... 370/329
See application file for complete search history.

(56) References Cited

U.S. PATENT DOCUMENTS 11,044,643 B2 6/2021 Centoza et al.
11,109,262 B2 8/2021 Pan
(Continued)

FOREIGN PATENT DOCUMENTS

CN 102355692 A 2/2012
CN 104683956 A 6/2015
(Continued)

OTHER PUBLICATIONS

International Search Report and Written Opinion mailed on May 8, 2018 for International Application No. PCT/CN2017/096609, filed on Aug. 9, 2017 (6 pages).
(Continued)

*Primary Examiner* — Nathan S Taylor
(74) *Attorney, Agent, or Firm* — Perkins Coie LLP

(57) ABSTRACT

Described are techniques for providing, a quality of service (QoS) update from a control plane of a base station to a user plane of the base station based on a QoS event, wherein the QoS update includes information indicative of a mapping between a QoS flow and corresponding radio resources for user data transmission, storing, at the user plane, the mapping between the QoS flow and the radio resources, receiving, at the user plane, a downstream data packet of the QoS flow from a core network, and transmitting the downstream data packet in a downlink direction using the corresponding radio resources.

9 Claims, 13 Drawing Sheets

(56) References Cited

U.S. PATENT DOCUMENTS

| | | | |
|---|---|---|---|
| 2013/0343215 A1* | 12/2013 | Li | H04B 7/0417 |
| | | | 370/252 |
| 2014/0376390 A1 | 12/2014 | Kreher et al. | |
| 2015/0078323 A1 | 3/2015 | Song et al. | |
| 2015/0085738 A1* | 3/2015 | Kim | H04W 40/246 |
| | | | 370/315 |
| 2017/0035749 A1 | 2/2017 | Drummond et al. | |
| 2017/0303287 A1 | 10/2017 | Yu et al. | |
| 2017/0317894 A1* | 11/2017 | Dao | H04L 41/5009 |
| 2017/0359749 A1* | 12/2017 | Dao | H04L 47/2416 |
| 2018/0083688 A1 | 3/2018 | Agiwal et al. | |
| 2018/0352482 A1 | 12/2018 | Gage et al. | |
| 2018/0368109 A1 | 12/2018 | Kim | |
| 2018/0376384 A1* | 12/2018 | Youn | H04W 92/02 |
| 2018/0376446 A1* | 12/2018 | Youn | H04W 76/30 |
| 2019/0028920 A1* | 1/2019 | Pan | H04L 47/24 |
| 2019/0029057 A1* | 1/2019 | Pan | H04W 76/10 |
| 2019/0150023 A1* | 5/2019 | Cho | H04W 28/0263 |
| | | | 370/235 |
| 2019/0230693 A1 | 7/2019 | Li et al. | |
| 2019/0253938 A1* | 8/2019 | Sayenko | H04W 36/08 |
| 2019/0342874 A1* | 11/2019 | Davydov | H04W 72/23 |
| 2019/0349803 A1* | 11/2019 | Byun | H04W 28/16 |
| 2019/0349810 A1* | 11/2019 | Cho | H04W 28/06 |
| 2019/0357076 A1* | 11/2019 | Han | H04W 80/08 |
| 2019/0357093 A1* | 11/2019 | Xu | H04W 24/10 |
| 2019/0364541 A1* | 11/2019 | Ryu | H04W 80/10 |
| 2020/0037197 A1* | 1/2020 | Cho | H04W 28/0263 |
| 2020/0037386 A1* | 1/2020 | Park | H04W 76/25 |
| 2020/0059823 A1* | 2/2020 | Lee | H04W 80/02 |
| 2020/0077356 A1* | 3/2020 | Youn | H04W 68/02 |
| 2020/0084677 A1* | 3/2020 | Yiu | H04W 76/28 |
| 2020/0084791 A1* | 3/2020 | Lee | H04W 72/21 |
| 2020/0092733 A1* | 3/2020 | Myhre | H04W 48/18 |
| 2020/0107275 A1* | 4/2020 | Cho | H04W 52/50 |
| 2020/0128430 A1* | 4/2020 | Yi | H04L 47/2491 |
| 2020/0128431 A1* | 4/2020 | Jo | H04L 5/0055 |
| 2020/0137675 A1* | 4/2020 | Park | H04W 68/005 |
| 2020/0145953 A1* | 5/2020 | Youn | H04W 60/04 |
| 2020/0178048 A1* | 6/2020 | Kim | H04W 12/062 |
| 2020/0178109 A1* | 6/2020 | Fang | H04W 72/543 |
| 2020/0178326 A1* | 6/2020 | Sirotkin | H04W 76/12 |
| 2020/0205224 A1* | 6/2020 | Lee | H04W 28/065 |
| 2020/0213894 A1* | 7/2020 | Agiwal | H04W 28/0263 |
| 2020/0267753 A1 | 8/2020 | Adjakple et al. | |
| 2020/0275302 A1* | 8/2020 | Youn | H04W 28/24 |
| 2020/0322831 A1* | 10/2020 | Xu | H04W 72/04 |
| 2020/0374948 A1* | 11/2020 | Pan | H04L 41/5019 |
| 2020/0382246 A1* | 12/2020 | Lee | H04W 80/02 |
| 2021/0092668 A1* | 3/2021 | Zaus | H04W 74/08 |
| 2021/0204160 A1* | 7/2021 | Jo | H04W 28/0263 |
| 2021/0409173 A1* | 12/2021 | Chatterjee | H04L 1/1812 |
| 2021/0410086 A1* | 12/2021 | Davydov | H04L 27/2613 |

FOREIGN PATENT DOCUMENTS

| | | |
|---|---|---|
| CN | 106332048 A | 1/2017 |
| EP | 2244409 A2 | 10/2010 |
| RU | 2608841 C1 | 1/2017 |
| WO | 2014/035418 A1 | 3/2014 |
| WO | 2017/101066 A1 | 6/2017 |
| WO | WO-2019024115 A1 * | 2/2019 ........ H04W 28/0252 |
| WO | WO-2019027995 A1 * | 2/2019 .......... H04J 13/0074 |

OTHER PUBLICATIONS

Intel Corporation, "Supporting Next Gen QoS in NR," 3GPP TSG-RAN WG2 Meeting #96, Reno, Nevada, R2-169070, Nov. 2016.

Zte et al., "RAN Consideration on the impact of QoS on NR CP," 3GPP TSG-RAN WG2 Meeting #95bis, Kaohsiung, R2-166335, Oct. 2016.

Zte et al., "Consideration on the impact of QoS on NR UP, " 3GPP TSG-RAN WG2 Meeting #95bis, Kaohsiung, R2-166336, Oct. 2016.

Partial Supplementary European Search Report for European Patent Application No. 17920745.1, mailed May 27, 2020.

Extended European Search Report for European Patent Application No. 17920745.1, mailed Sep. 17, 2020.

Office Action for Russian Patent Application No. 2020109671, mailed Sep. 24, 2020.

Office Action for Chinese Patent Application No. 201780093823.5, mailed Nov. 4, 2020.

Zte, "Discussion on UE Radio Bearer Management over F1 interface," 3GPP TSG-RAN WG3 Meeting #96, Hangzhou, P.R. China, R3-171597, May 2017.

Huawei et al., "TP for Bearer Management over F1," 3GPP TSG-RAN WG3 Meeting #96, Hangzhou, P.R. China, R3-171859, May 2017.

Office Action for Japanese Patent Application No. 2020-506943, mailed May 11, 2021.

3GPP TR 38.912 V1.0.0, "3rd Generation Partnership Project; Technical Specification Group Radio Access Network; Study on New Radio (NR) Access Technology," Mar. 2017, 74 pages.

Ericsson, "Reflective QoS and Flow-ID," 3GPP TSG-RAN WG2 #98, Hangzhou, China, May 15-19, 2017, Tdoc R2-1704379, 6 pages.

Ericsson, et al., "Separation of CP and UP," 3GPP TSG-RAN WG3 #96, Hangzhou, China, May 15-19, 2017, Tdoc R3-171725, 3 pages.

Ericsson, et al., "Separation of CP and UP," 3GPP TSG-RAN WG3 #96, Hangzhou, China, May 15-19, 2017, R3-171915, 3 pages.

Huawei, et al., "Reflective Mapping Handling During Handover," 3GPP TSG-RAN WG2 Meeting #98, Hangzhou, China, May 15-19, 2017, R2-1704978, 2 pages.

Huawei, et al., "DRB Management and QoS Control," 3GPP TSG-RAN2 WG3 #95bis, Kaohsiung, Oct. 10-14, 2016, R2-166199, 3 pages.

Intel Corporation, et al., "QoS profile for Default DRB and Default QoS profile," 3GPP TSG RAN WG3 NR#2 Adhoc, Qingdao, China, Jun. 27-29, 2017, R3-172302, 3 pages.

LG Electronics Inc., "Further discussion on Reflective QoS," 3GPP TSG-RAN2 Meeting #98, Hangzhou, China, May 15-19, 2017, R2-1704470, 4 pages.

Nokia, et al., "Reflective QoS in AS," 3GPP TSG-RAN WG2 Meeting #98, Hangzhou, China, May 15-19, 2017, R2-1704279, 2 pages.

Zte, et al., "Discussion on the supporting of reflective QoS," 3GPP TSG-RAN WG2 Meeting #97bis, Spokane, USA, Apr. 3-7, 2017, R2-1702829, 5 pages.

Notice of Allowance for Korean Patent Application No. 10-2020-7006764, mailed Oct. 13, 2021.

Decision of Patent for Japanese Patent Application No. 2020-506943, mailed Oct. 12, 2021.

European Patent Office, Communication pursuant to Article 94(3)EPC for European Patent Application No. 17920745.1, Jul. 13, 2023, 7 pages.

European Patent Office, Extended European Search Report for European Application No. 23172810.6, mailed on Jul. 17, 2023, 10 pages.

Zte, "Discussion on reflective QoS," 3GPP TSG RAN WG2 #NR_AdHoc#2, Qingdao, China, R2-1706668, Jun. 27-29, 2017, 4 pages.

Intel et al., "23.501: Corrections to Reflective QoS," 3GPP TSG SA WG2 #121, Hangzhou, China, S2-174038, May 14-19, 2017, 7 pages.

EPO, Intention to Grant for European Application No. 23 172 810.6, mailed on Oct. 29, 2024, 7 pages.

* cited by examiner

QUALITY OF SERVICE IMPLEMENTATIONS FOR SEPARATING USER PLANE

CROSS REFERENCE TO RELATED APPLICATIONS

This patent document is a continuation of and claims benefit of priority to U.S. patent application Ser. No. 17/474,494, filed Sep. 14, 2021, which is a divisional of and claims benefit of priority to U.S. patent application Ser. No. 16/783,114, filed Feb. 5, 2020 and is now U.S. Pat. No. 11,146,984, which is a continuation of International Patent Application No. PCT/CN2017/096609, filed on Aug. 9, 2017. The entire content of the before-mentioned patent applications is incorporated by reference as part of the disclosure of this application.

TECHNICAL FIELD

This document relates to systems, devices and techniques for wireless communications.

BACKGROUND

Efforts are currently underway to define next generation wireless communication networks that provide greater deployment flexibility, support for a multitude of devices and services and different technologies for efficient bandwidth utilization. For better bandwidth utilizations, various techniques, including new ways to provide higher quality of service, are being discussed.

SUMMARY

This document describes technologies, among other things, for providing quality of service to data flows in a network architecture in which user plane and control plane are logically separated from each other.

In one example aspect, a method of wireless communication is disclosed. The method includes providing, a quality of service (QoS) update from a control plane of a base station to a user plane of the base station based on a QoS event, wherein the QoS update includes information indicative of a mapping between a QoS flow and corresponding radio resources for user data transmission, storing, at the user plane, the mapping between the QoS flow and the radio resources, receiving, at the user plane, a downstream data packet of the QoS flow from a core network, and transmitting the downstream data packet in a downlink direction using the corresponding radio resources.

In another example aspect, another method of wireless communication is disclosed. The method includes providing, a quality of service (QoS) update from a control plane of a base station to a user plane of the base station based on a QoS event, wherein the QoS update includes information identifying one or more QoS flows that are symmetric, such that a downlink QoS parameter for the one or more QoS flows is determinable for a corresponding uplink information, storing, at the user plane, identities of the one or more QoS flows that are symmetric, receiving, at the user plane, a downstream data packet of a given QoS flow from a core network, and transmitting the downstream data packet in a downlink direction using the corresponding radio resources.

In yet another example aspect, a method of wireless communication is disclosed. The method includes receiving, at a base station, a data packet for downstream transmission from a core network, wherein the data packet includes a quality of service flow indicator, obtaining, by the user plane of the base station, from a control plane of the base station, a mapping between the quality of service flow indicator and a radio resource for downstream transmission, and transmitting the data packet in a downstream direction using the mapping obtained from the control plane.

In yet another example aspect, a disclosed method of wireless communication includes receiving, at a base station, on an uplink radio resource, a data packet for upstream transmission from a user equipment, wherein the data packet includes a quality of service flow indicator, obtaining, by the user plane, from a control plane of the base station, a mapping between the quality of service flow indicator and the uplink radio resource and associating, for a next data packet received on the uplink radio resource, a quality of service flow indicated by the quality of service flow indicator.

In yet another aspect, a disclosed wireless communication method includes receiving, at a base station, on an uplink radio resource, a data packet for upstream transmission from a user equipment, wherein the data packet includes a quality of service flow indicator, obtaining, by the user plane, from a control plane of the base station, a mapping between the quality of service indicator and the uplink radio resource, wherein the mapping indicates that the mapping is of a symmetric type, and transmitting a message to the user equipment indicating that the mapping is of the symmetric type.

In yet another example aspect, a wireless communications apparatus comprising a processor is disclosed. The processor is configured to implement a method described herein.

In another example aspect, the various techniques described herein may be embodied as processor-executable code and stored on a computer-readable program medium.

The details of one or more implementations are set forth in the accompanying attachments, the drawings, and the description below. Other features will be apparent from the description and drawings, and from the claims.

BRIEF DESCRIPTION OF THE DRAWINGS

Like reference symbols in the various drawings indicate like elements.

DETAILED DESCRIPTION

In the 4G (4 Generation) or LTE (Long Term Evolution) mobile communication systems, a data stream having the same QoS (Quality of Service) requirement is aggregated into a bearer, a radio access network (Radio Access Network, RAN) and the core network (Core Network, CN) on the QoS processing is carried by the load. In the 4G system, the RAN includes an evolved Node B (eNB) and a User Equipment (UE). The network bearer between the eNB and the core network interface with each other on the S1 interface and the radio bearer communicates on the radio interface between the eNB and the UE have one to one correspondence.

In the upcoming 5G system, the core network, base stations and UE are expected to undergo several changes. A 5G base station is sometimes called gNB (Next Generation Node B, next generation base station). Similar to the 4G system between the eNB X2 interface, the gNB interface on an interface called Xn. The interface between the gNB and the 5G core network is called the NG interface. A 5G system is expected to use a new QoS mechanism. The radio interface on the radio bearer may use a DRB (Data Radio Bearer, data radio bearer), but there is no corresponding NG interface on the network side, instead the concept of the PDU Session (Protocol Data Unit Session, Protocol Data Unit Session, and QoS Flow (Quality of Service Flow) is used. A UE can have multiple PDU sessions. A PDU session can contain multiple QoS flows. Multiple QoS flows of the same PDU session can be mapped to the same DRB. The QoS flow of different PDU sessions cannot be mapped to the same DRB.

The new 5G QoS mechanism also introduced the NAS Reflective (Non-Access-Stratum Reflective) and AS Reflective (Access-Stratum Reflective) functions, mainly in order to save control overhead. The NAS Reflective is the user-facing way to complete the uplink direction SDF (Service Data Flow, service data flow) to the QoS flow mapping relationship configuration, the AS Reflective is through the user plane to the way the UE completes the upstream direction QoS flow To the DRB mapping relationship.

In a 5G base station, a new protocol sublayer is introduced above the PDCP (Packet Data Convergence Protocol) called SDAP (Service Data Adaptation Protocol) for QoS flow and DRB mapping (Mapping), etc. In some embodiments, each PDU Session has an SDAP entity (Entity).

A 5G base station can be conceptually divided into CU (Central Unit) and DU (Distributed Unit). According to various embodiments, one base station has one CU, a base station can have multiple DU, called centralized unit distribution unit separation (CU-DU Split).

Figure 1:
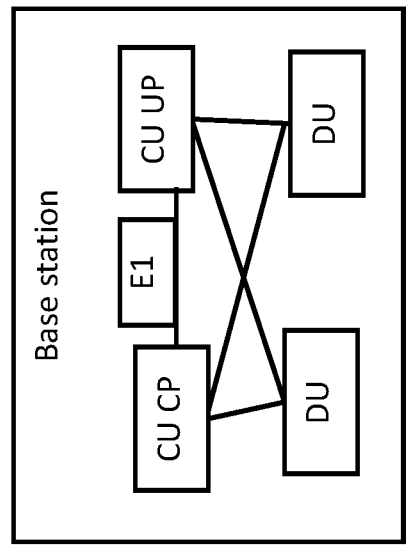
FIG. 1 shows an example of a base station configuration.
Figure 1:
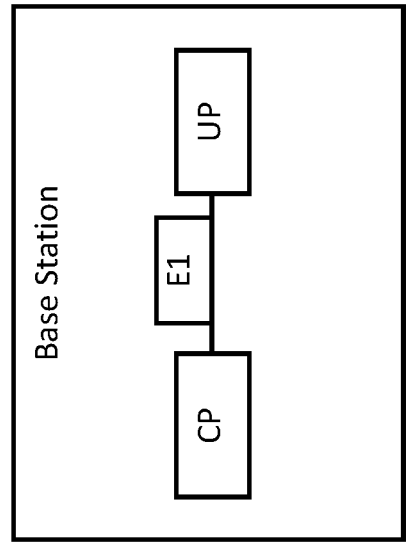

The CU of 5G base station or a 5G base station can be conceptually divided into CP (Control Plane) and UP (User Plane). It is called CP-UP Split, for the F1 interface. The interface between CP and UP is called E1 interface, as shown in an example embodiment of FIG. 1. Control Plane includes, for example, Radio Resource Management (RRM), Radio Resource Control (RRC) and Packet Data Convergence Protocol C-Plane (PDCP-C) function of a 5G base station. User Plane includes, for example, Packet Data Convergence Protocol U-Plane (PDCP-U) function of a 5G base station.

The present document provides multiple ways by which QoS can be implemented in architectures such as the upcoming 5G networks. In some embodiments, the disclosed techniques can be implemented in a wireless system architecture in which the control plane and the user plane are logically separated, as described with respect to the 5G systems. Certain concepts from 5G architecture are used to describe various embodiments only for the ease of understanding and the disclosed techniques can be embodied in other communication networks also.

In some embodiments, to solve the above-discussed problems, a method for implementing a new QoS mechanism is disclosed. Example embodiments 1 and 2 described in the present document. The embodiments describe implementing the QoS method in a 5G system in a scenario where the control plane user plane is separated.

In some embodiments, the base station controls to send an update message to the base station user plane so that the base station user plane knows in time the flow of QoS Flow to the DRB (including the upstream direction and the downstream direction) and/or updates the base station user plane and which QoS flow needs to be performed NAS Reflective.

In some embodiments, the base station user plane stores information from the update message: QoS Flow to DRB mapping (including upstream and downstream), and/or QoS Flow information that requires NAS Reflective.

In some embodiments, the base station user plane receives a downlink packet from the core network according to the latest downlink direction QoS Flow to DRB mapping relationship. The downlink packet may include a quality of service flow identity (QFI). The base station may use the QFI which DRB the packet should be mapped to when transmitting downstream over the wireless interface. Alternatively or in addition the base station may decide the mapping according to the rules of the stored NAS Reflective QoS Flow information, downlink data packets contained in the QFI, and determine whether the downlink packet in the wireless interface to send with QFI.

In some embodiments, when the base station user plane receives a downlink packet from the core network, the base station may perform mapping according to the QoS flow corresponding to the QFI contained in the downlink packet. When the corresponding downlink QoS flow to the DRB mapping relationship cannot be found on the base station user plane, The user plane sends a request message to the base station control plane to request the base station control plane to determine the mapping relationship of the QoS flow to the DRB in the downlink direction.

In some embodiments, the base station control plane determines the mapping relationship of the associated QoS flow downstream to the DRB. The base station control plane responds to the response message. In some embodiments, the control plane may carry one or more downlink QoS flow to the DRB mapping relationships, as determined by the base station control plane. The base station control plane may optionally also carry one or more relevant DRB configuration information (for the base station user plane to establish the relevant DRB).

In some embodiments, the base station user plane stores information from the response message in the form of a downstream direction QoS Flow to DRB mapping.

In some embodiments, the base station user plane determines the DRB to which the downstream packet should be mapped when the downlink packet is to be transmitted according to the latest downstream direction QoS Flow to the DRB mapping relationship for the downlink packets that have not yet been transmitted on the radio interface. If it is found that the corresponding DRB has not been established, the corresponding DRB may be obtained, e.g., based on the configuration information of the DRB from the response message.

In some embodiments, when the base station user plane receives the uplink packet sent from the UE on a predetermined or default DRB (default DRB), the user plane checks whether the QoS flow of the QFI contained in these uplink packets has the corresponding upstream direction QoS Flow to DRB mapping relationship on the base station user plane. If a correspondence is not found, the base station user plane sends a request message to the base station control plane to request the base station control plane to determine the upstream direction of the QoS flow to the DRB mapping relationship.

In some embodiments, the base station control plane determines the mapping relation of the relevant QoS flow to the DRB and configures the mapping relation of the relevant QoS flow to the DRB to the UE through an upper layer message such as the RRC (Radio Resource Control) message, or the AS Reflective to configure the mapping of the QoS flow upstream to the DRB to the UE.

In some embodiments, the base station controls the response message to carry one or more upstream QoS flows to the DRB mapping relationship determined by the base station control plane. When passing through the AS Reflective mode, it also carries an indication that AS Reflective is to be used.

When the AS Reflective mode is adopted, the base station user plane is instructed to use AS Reflective. When the downstream packet is received from the core network, the corresponding downlink packet, e.g., the corresponding QoS flow of the QFI contained in the downstream packet Flow, is made to be AS Reflective according to the indication in the response message. The QFI and AS Reflective bits are sent when the radio interface is sent for the UE to generate the associated QoS flow to the DRB mapping relationship.

In some embodiments, the base station user plane stores the information from the response message that includes the upstream direction QoS Flow to the DRB mapping relationship.

In some embodiments, when the base station user plane receives the upstream packet sent from the UE on the Default DRB, the QoS flow of the QFI included in the uplink packet can be found based on the latest upstream QoS flow to the DRB mapping relationship stored at the base station. At the base station the user plane may have a corresponding uplink direction QoS Flow to the DRB mapping relationship. In this case, the base station user plane no longer has to send the request message to the base station control plane.

In one advantageous aspect, the disclosed techniques can be used to implement a new QoS mechanism in the 5G system can be implemented when there is control plane-user plane separation.

Several embodiments are described in the present document with reference to the signal flow diagram examples in FIG. 2 to FIG. 6.

Example Embodiment 1

Figure 2:
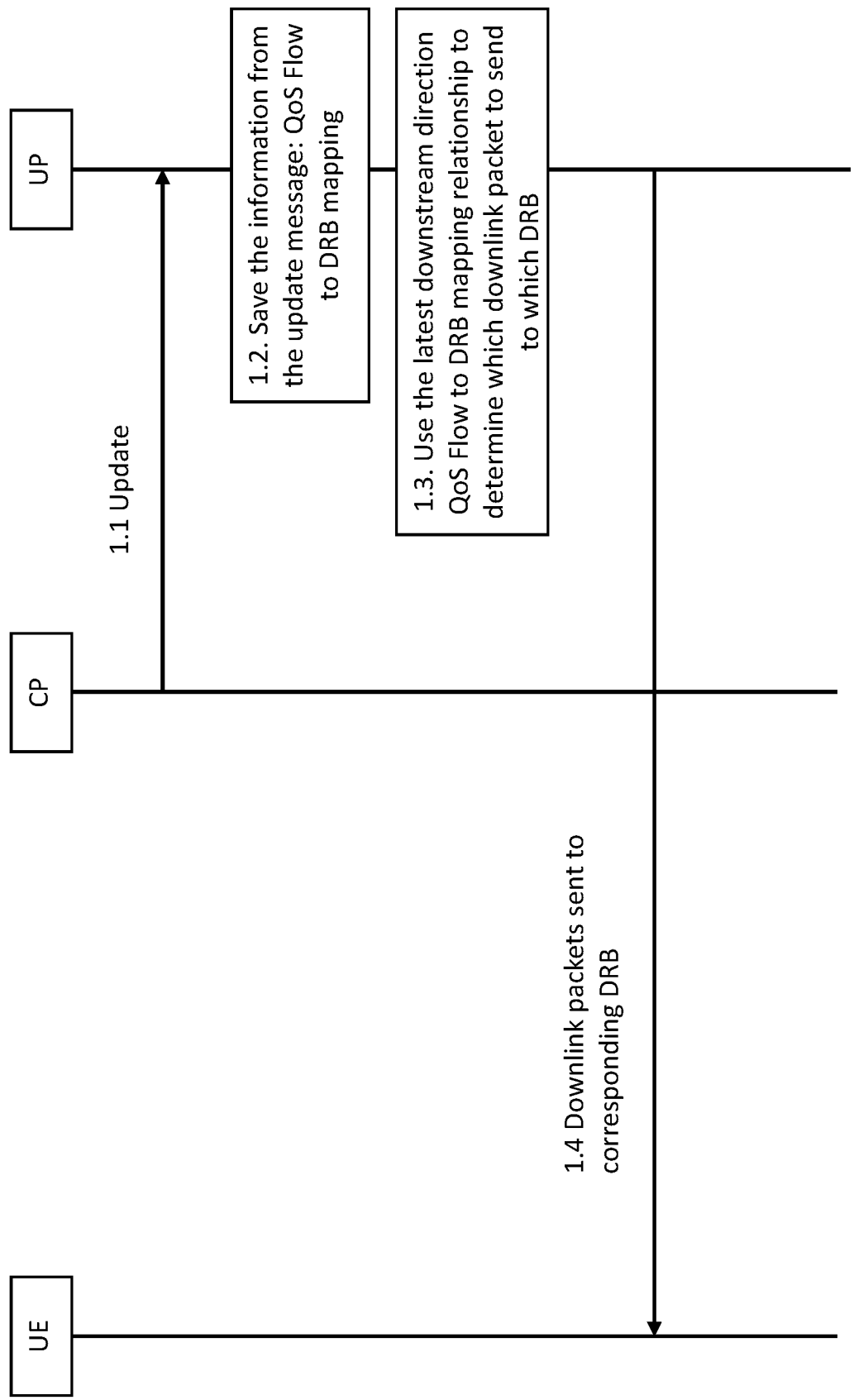
FIG. 2 shows an example of messages exchanged among user equipment, a control plane (CP) of a base station and a user plane (UP) of the base station.

With reference to FIG. 2, the following operations may be performed.

Step 1.1: When the base station control plane receives the control information about the network, such as the addition or deletion of QoS flow from the core network, or when the base station control plane remaps the mapping of the QoS Flow to the DRB, the base station provides (including uplink and downlink direction) an update status of the QoS flow to the DRB. The update message may carry the associated QoS flow in the upstream direction and/or the downlink direction to the DRB. The update message may include each mapping relationship includes QFI (QoS Flow ID, Quality of Service ID) and DRB ID (Data Radio Bearer ID). Alternatively, in some embodiments, the update message may only transmit values that have changed from a previously sent update.

Step 1.2: The base station user plane saves the information from the update message. This information includes QoS Flow to DRB mapping including mapping for both upstream and downstream directions.

In step 1.3, when the base station user plane receives a downlink packet from the core network, it is determined that the downlink packet should be mapped to the radio interface, and a corresponding DRB, according to the latest downstream direction QoS Flow to the DRB mapping relationship and the QFI included in the downlink packet.

Step 1.4: The base station user plane sends the downlink packet to the UE on the corresponding DRB at the radio interface.

Example Embodiment 2

Figure 3:
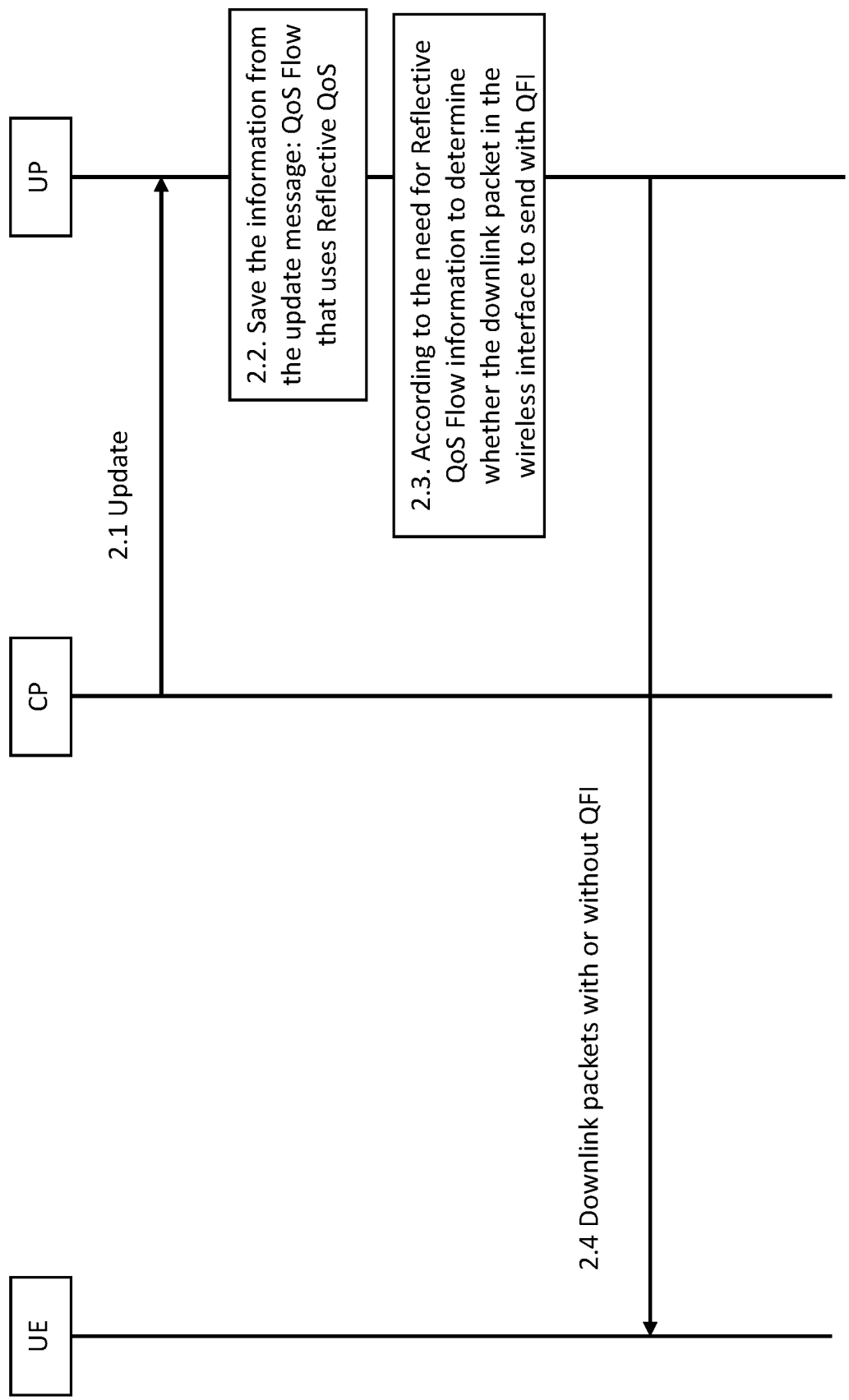
FIG. 3 shows an example of messages exchanged among user equipment, a control plane (CP) of a base station and a user plane (UP) of the base station.

With reference to FIG. 3, the following operations may be performed.

In step 2.1, when the base station control plane receives the control information of the NAS Reflective from the core network about the certain QoS flow, the base station controls to send the update message to the base station user plane so that the base station user plane knows which QoS flows are to be NAS Reflective. The update message carries one or more QFIs that can be used for QoS filtering for NAS Reflective.

Step 2.2: The base station user plane saves the information from the update message, including the QoS flow information of NAS Reflective.

Step 2.3: When the base station user plane receives the downlink packet from the core network, it searches the QoS information of the NAS Reflective according to the saved information and the QFI included in the downlink packet to determine whether the downstream packet is to carry the QFI. Specifically the user plane may determine whether the QFI contained in the downstream packet is the QFI of the QoS flow that is to be NAS Reflective. If not, the downstream packet is sent to the UE via the radio interface, without QFI to save wireless resources. If so, QFI is used in the packet sent to the UE.

Step 2.4: The base station user plane sends a downlink packet with QFI or without QFI to the UE at the radio interface.

Example Embodiment 3

Figure 4:
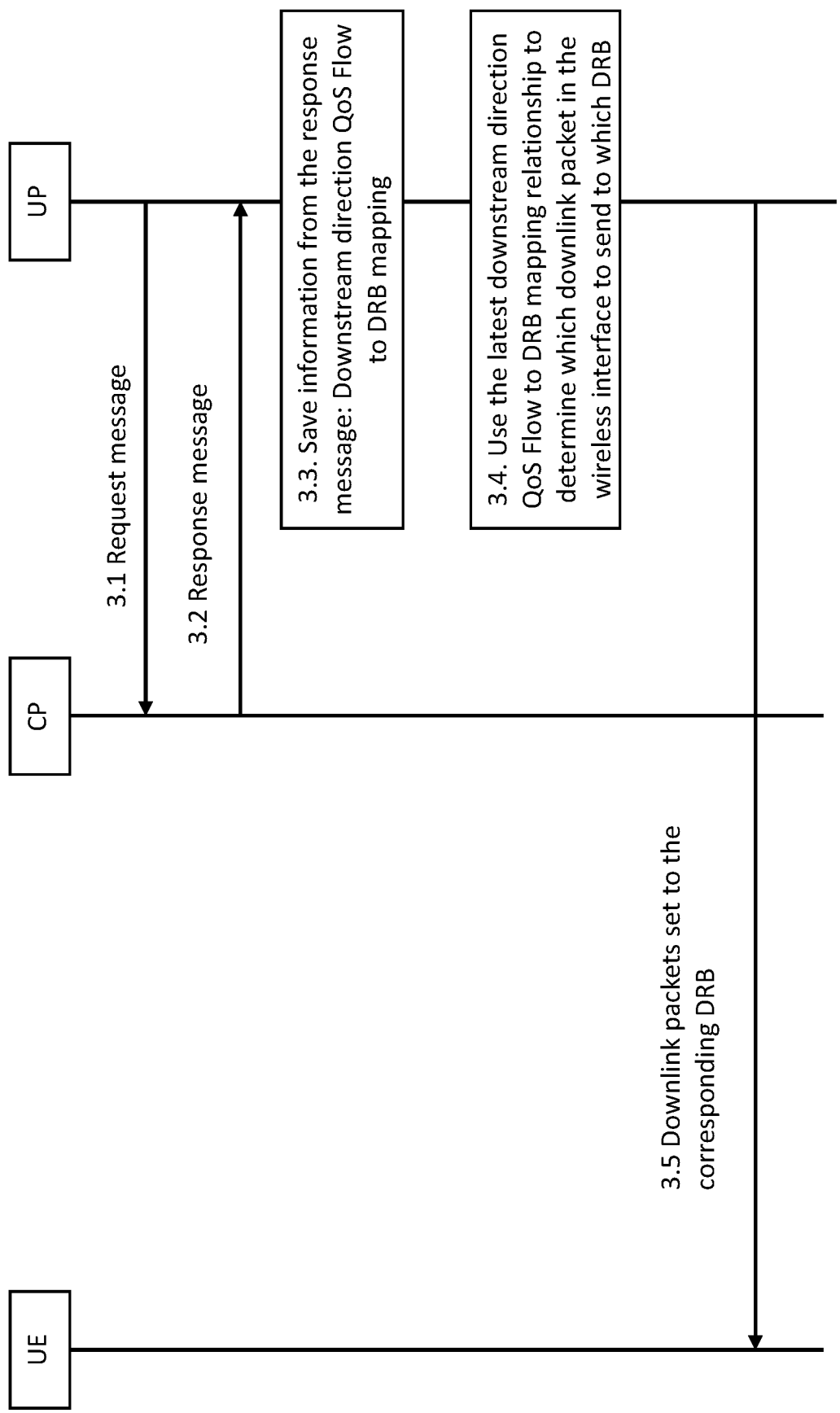
FIG. 4 shows an example of messages exchanged among user equipment, a control plane (CP) of a base station and a user plane (UP) of the base station.

With reference to FIG. 4, the following operations may be performed.

In step 3.1, when the base station user plane receives the downlink packet from the core network, it is found that there is no corresponding downlink QoS flow to the DRB mapping relationship on the base station user plane according to the QoS flow corresponding to the QFI contained in the downlink packet. In this case, without additional information, there is no way to determine the downlink packet in the wireless interface to send to which DRB should be mapped. At this time, the base station user plane sends a request message to the base station control plane to request the base station control plane to determine the mapping of the QoS flow to the DRB in the downlink direction, and the request message carries one or more QFI of the QoS flow that needs to determine the mapping relationship to the DRB.

In step 3.2, the base station control plane determines the mapping relationship of the related QoS flow to the DRB. To achieve this, the base station control plane responds to the response message, carrying one or more downlink QoS flows to the DRB mapping relationship determined by the base station control plane. The response can optionally carry one or more related DRB configuration information (for the base station user plane to establish the relevant DRB).

Step 3.3: The base station user plane saves the information from the response message, including the downstream direction QoS Flow to the DRB mapping relationship.

In step 3.4, the base station user plane determines the DRB to which the downlink packet should be mapped when the downlink packet is transmitted according to the latest downlink QoS flow to the DRB mapping relationship for the downlink packets that have not yet been transmitted on the radio interface. If it is found that the corresponding DRB has not been established, the corresponding DRB (based on the configuration information of the DRB from the response message) is established.

Step 3.5: The base station user plane sends the downlink packet to the UE on the corresponding DRB at the radio interface.

Example Embodiment 4

Figure 5:
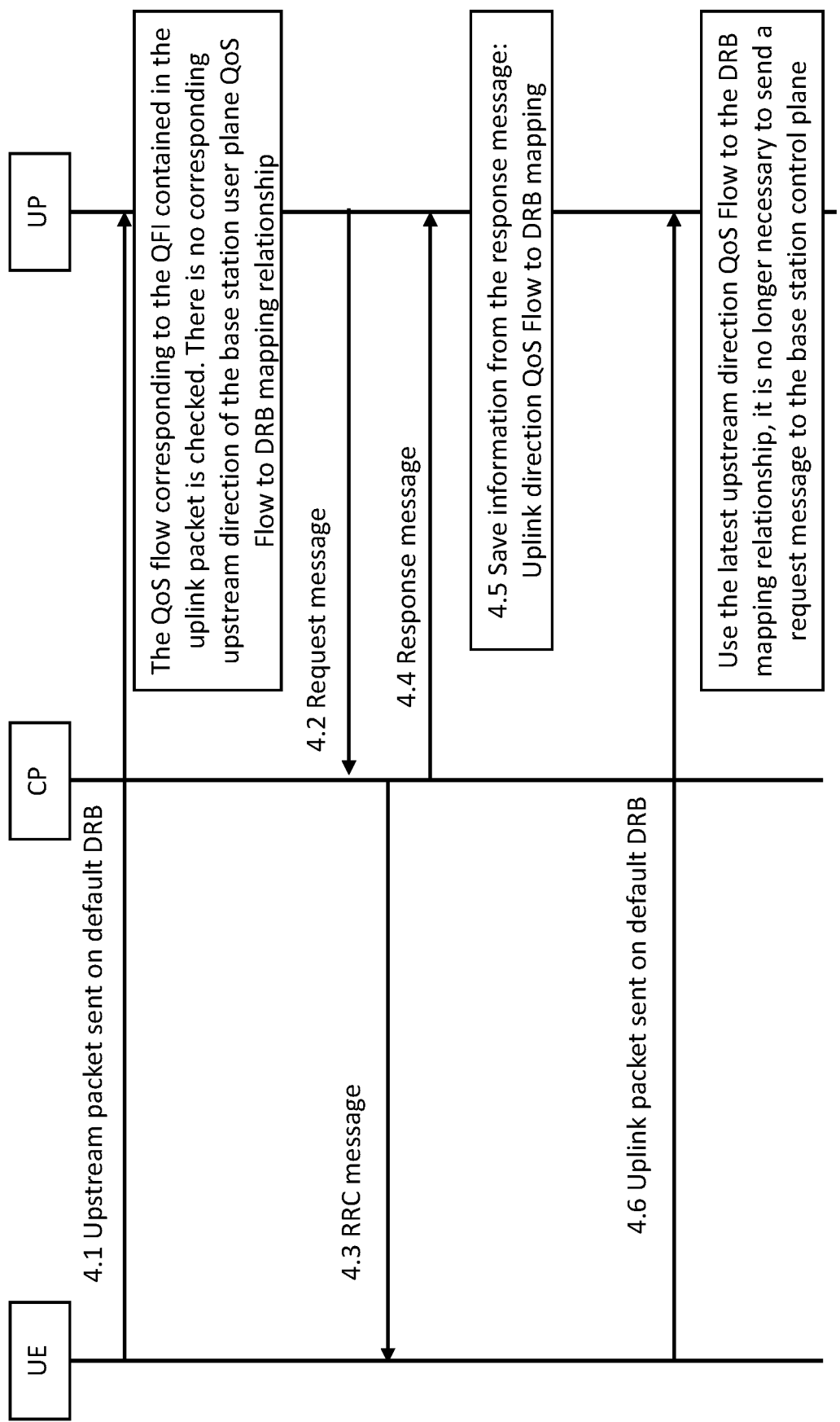
FIG. 5 shows an example of messages exchanged among user equipment, a control plane (CP) of a base station and a user plane (UP) of the base station.

With reference to FIG. 5, the following operations may be performed.

In step 4.1, when the base station user plane receives the uplink packet sent from the UE on a Default DRB ("Default DRB"), the user plane checks whether the QoS flow corresponding to the QFI contained in the uplink packet has a corresponding uplink direction QoS Flow to DRB mapping available at the base station user plane.

Step 4.2, the base station user plane sends a request message to the base station control plane to request the base station control plane to determine the mapping relationship of the QoS flow to the DRB in the uplink direction. The request message includes one or more QoS flows for which the mapping relationship of the uplink direction to the DRB QFI is to be determined.

Step 4.3: The base station control plane determines the mapping relationship between the uplink traffic direction QoS flow and the DRB. The base station control plane configures the mapping relation of the relevant QoS flow to the DRB through an RRC (Radio Resource Control) message.

Step 4.4: The base station control plane sends a response message that carries the mapping relationship of one or more upstream QoS flows to the DRB, as determined by the base station control plane.

Step 4.5: The base station user plane saves the information from the response message, including the upstream direction QoS Flow to the DRB mapping relationship.

In step 4.6, when the base station user plane receives the uplink packet transmitted from the UE on the Default DRB, the base station user plane can find the QoS flow of the QFI contained in the uplink packet according to the latest upstream QoS flow to the DRB mapping relationship has a corresponding uplink QoS mapping to the DRB on the base station user plane, and the base station user plane no longer needs to send the request message to the base station control plane.

Example Embodiment 5

Figure 6:
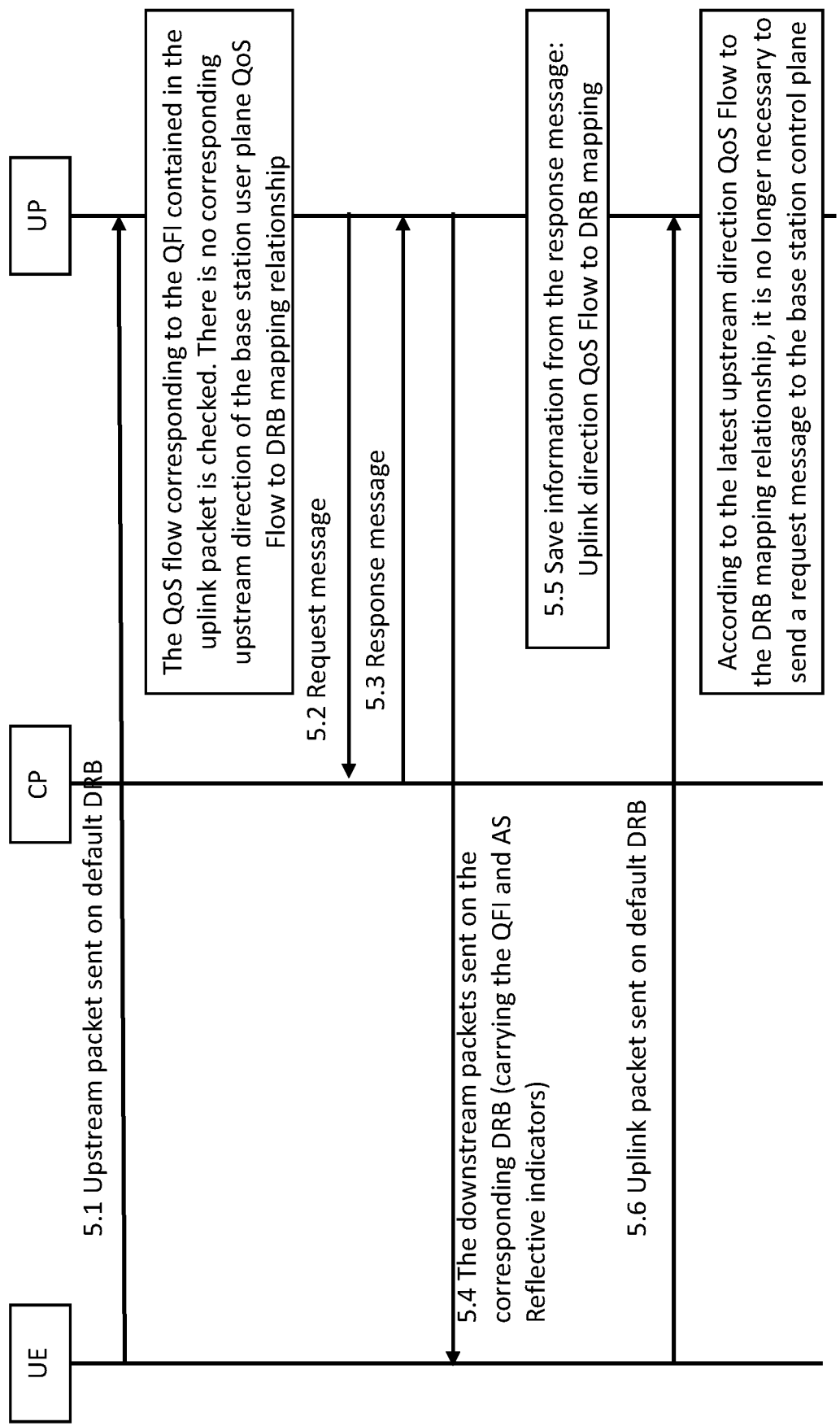
FIG. 6 shows an example of messages exchanged among user equipment, a control plane (CP) of a base station and a user plane (UP) of the base station.

With reference to FIG. 6, the following operations may be performed.

Step 5.1 and Step 5.2—same as in embodiment 4.

In step 5.3, the base station control plane determines the mapping relationship of the relevant QoS flow to the DRB; the base station control plane sends a response message that carries one or more upstream QoS flows to the DRB mapping relationship determined by the base station control plane and AS Reflective instructions.

Step 5.4: The base station user plane is instructed that AS Reflective is to be used. When the downlink packet from the core network is received, corresponding to the corresponding downlink packet (that is, the QFI corresponding to the downlink packet) indicates that the AS Reflective is used, the QFI and AS Reflective bit is to be sent to the UE to generate the mapping of the associated uplink QoS flow to the DRB.

Figure 7:
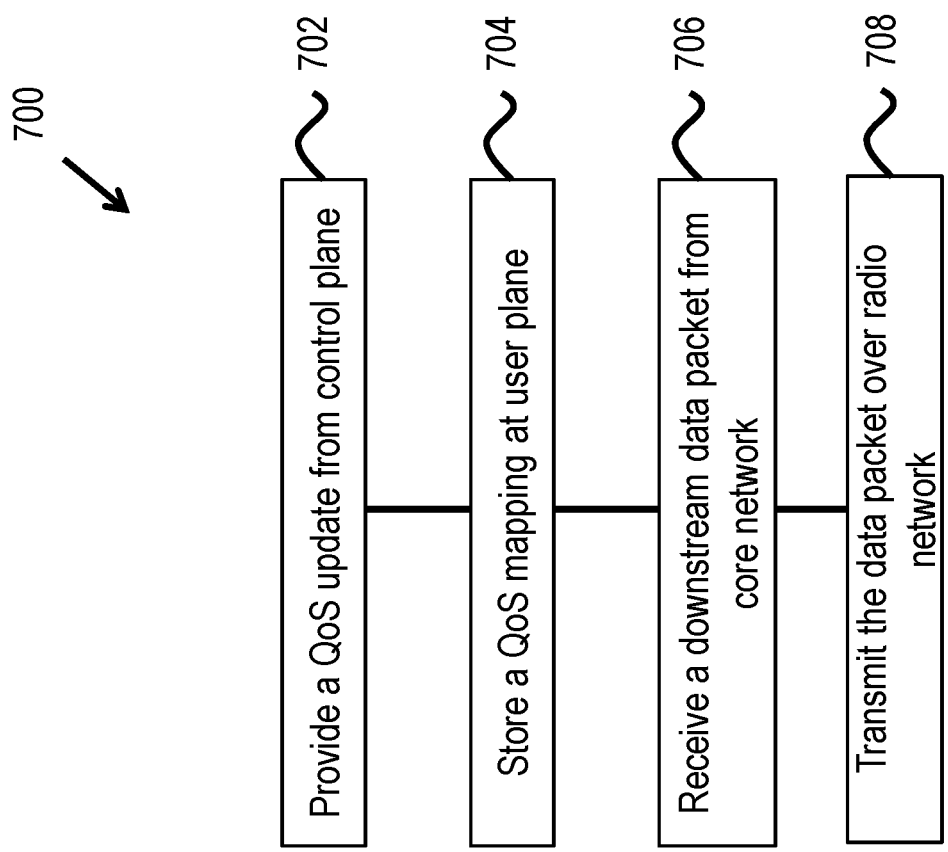
FIG. 7 is a flowchart of an example wireless communication method.

FIG. 7 is a flowchart of an example wireless communication method 700. The method 700 may be implemented by a base station such as the gNB. The method 700 includes providing (702), a quality of service (QoS) update from a control plane of a base station to a user plane of the base station based on a QoS event, wherein the QoS update includes information indicative of a mapping between a QoS flow and corresponding radio resources for user data transmission. For example, in some embodiments, the QoS event may include receiving a notification from the core network about addition or deletion of at least one QoS flow from the network. For example, in some embodiments, the QoS event includes remapping between QoS flows and radio resources.

The method 700 further includes storing (704), at the user plane, the mapping between the QoS flow and the radio resources. The mapping may be stored in a memory in the form of a look-up table that is controlled by the user plane. For example, only the user plane may be able to read or write to the look-up table.

The method 700 also includes receiving (706), at the user plane, a downstream data packet of the QoS flow from a core network. In various embodiments, the communication from the core network may be received on a wired or wireless interface. The method 700 includes transmitting (708) the downstream data packet in a downlink direction using the corresponding radio resources.

Figure 8:
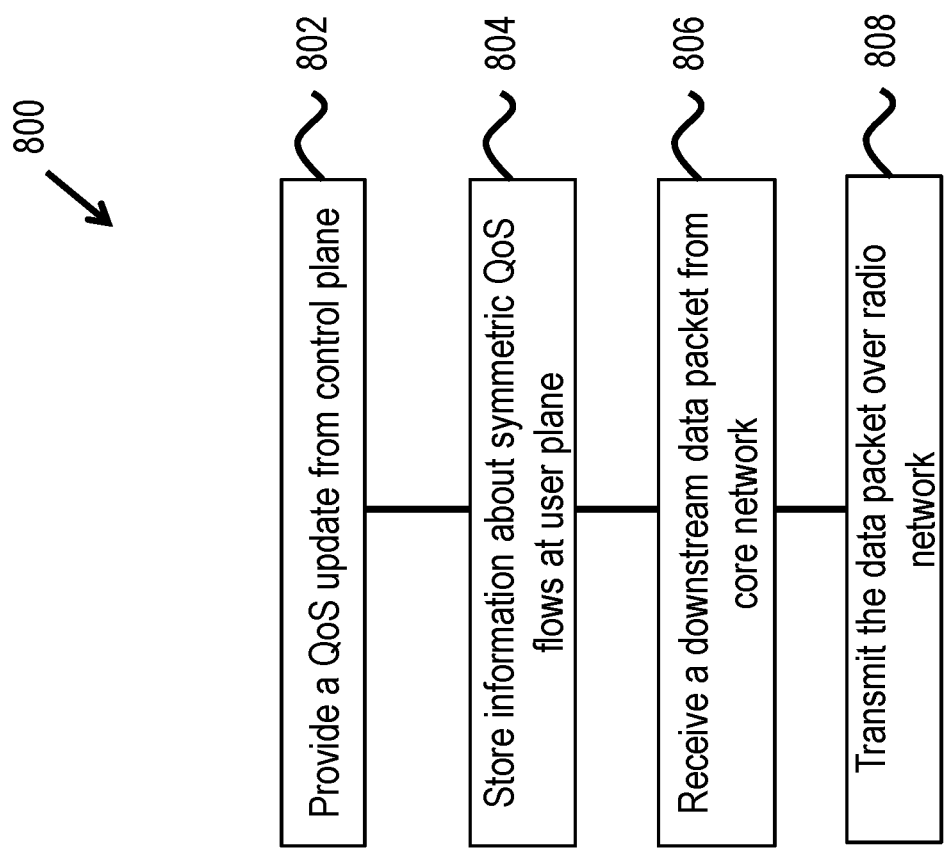
FIG. 8 is a flowchart of an example of another wireless communication method.

FIG. 8 is a flowchart of an example of another wireless communication method 800. The method 800 includes providing (802), a quality of service (QoS) update from a control plane of a base station to a user plane of the base station based on a QoS event, wherein the QoS update includes information identifying one or more QoS flows that are symmetric. A symmetric QoS flow may be one for which a downlink QoS parameter for the one or more QoS flows is determinable for a corresponding uplink information. For example, the NAS Reflective attribute defined in 5G may be a symmetric flow. The method 800 includes storing, at the user plane, identities of the one or more QoS flows that are symmetric. The identities may be stored in a memory access to which is exclusively controlled by the user plane. The method 800 includes receiving (806), at the user plane, a downstream data packet of a given QoS flow from a core network. The method 800 includes transmitting (808) the downstream data packet in a downlink direction using the corresponding radio resources.

Figure 9:
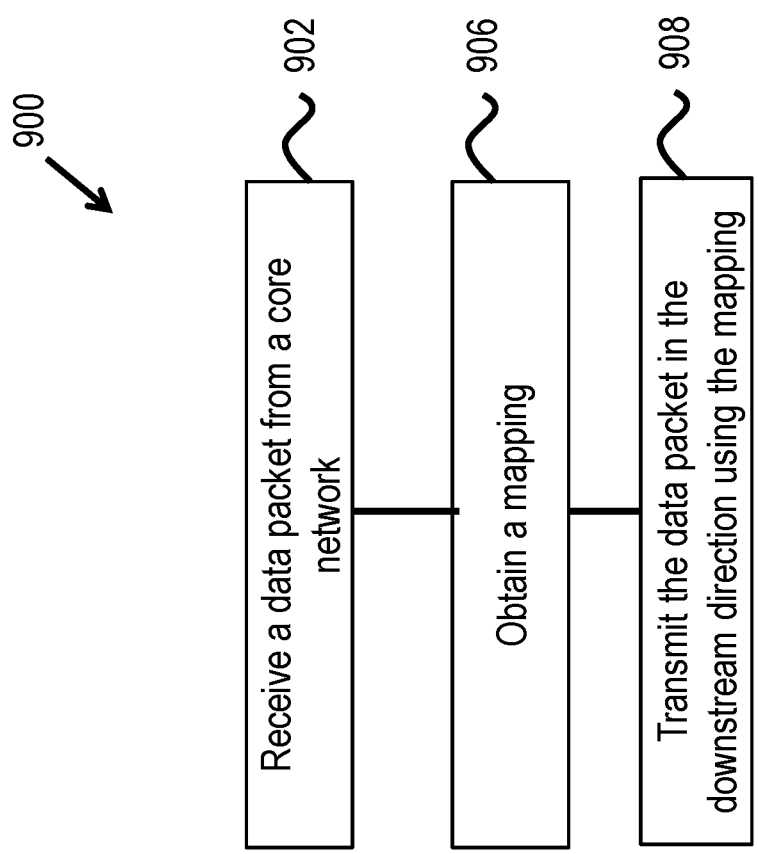
FIG. 9 is a flowchart of an example of another wireless communication method.

FIG. 9 is a flowchart of an example of another wireless communication method 900. At 902, a data packet for downstream transmission from a core network is received by a base station. The data packet may be received on a wired or a wireless communication connection. The data packet includes a quality of service flow indicator. At 906, the user plane obtains a mapping between the quality of service flow indicator and a radio resource for downstream transmission from a control plane of the base station. At 908, the user plane transmits the data packet in a downstream direction using the mapping obtained from the control plane. In some embodiments, the user plane may decide, based on the quality of service flow indicator that a mapping is to be established (e.g., when no mapping is locally available at the user plane). The decision may be made by looking up information stored in a memory local to the user plane. For example, read or write access to the memory may only be available through the user plane.

Figure 10:
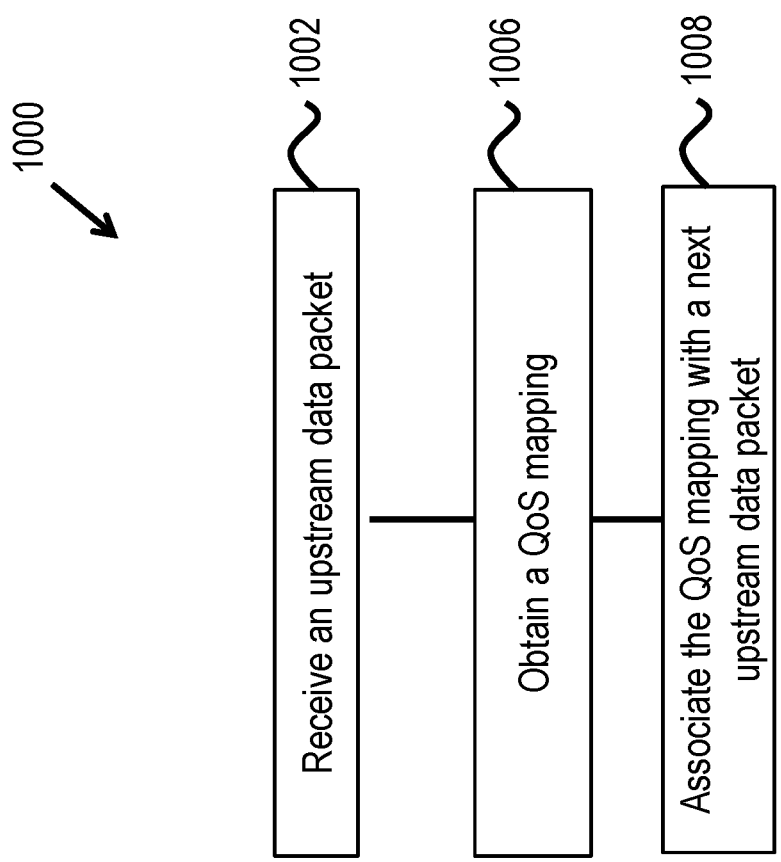
FIG. 10 is a flowchart of an example of another wireless communication method.

FIG. 10 is a flowchart of an example of another wireless communication method 1000. At 1002, a base station receives, on an uplink radio resource, a data packet for upstream transmission from a user equipment. The data packet includes a quality of service flow indicator. At 1006, the user plane obtains a mapping between the quality of service flow indicator and an uplink radio resource from a control plane of the base station. At 1008, the method 1000 includes associating, for a next data packet received on the uplink radio resource, a quality of service flow indicated by the quality of service flow indicator. In some embodiments, the mapping between the quality of service flow indicator and the uplink radio resource is obtained when the user plane determines that the mapping is to be established, e.g., not available at the user plane.

Figure 11:
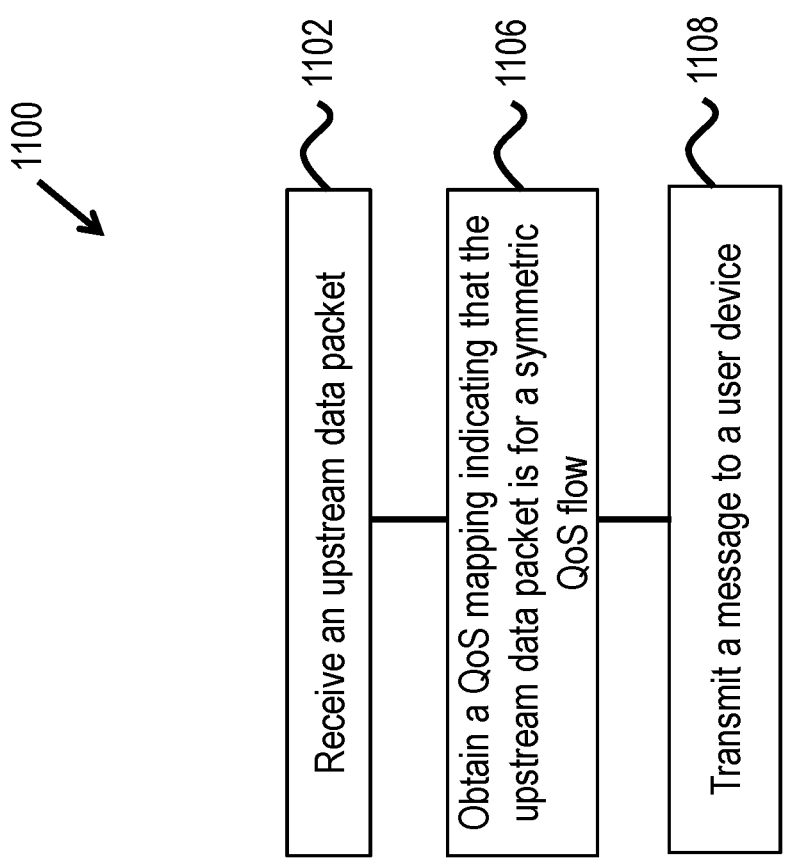
FIG. 11 is a flowchart of an example of another wireless communication method.

FIG. 11 is a flowchart of an example of another wireless communication method 1100. The method 1100 includes receiving (1102), at a base station, on an uplink radio resource, a data packet for upstream transmission from a user equipment, wherein the data packet includes a quality of service flow indicator. The method 1100 includes selectively obtaining (1106), by the user plane, from a control plane of the base station, a mapping between the quality of service indicator and the uplink radio resource, wherein the mapping indicates that the mapping is of a symmetric type. The method 1100 includes transmitting (1108) a message to the user equipment indicating that the mapping is of the symmetric type. In some embodiments, the method 1100 includes determining that the mapping is to be established because of non-availability of the mapping at the user plane and, in response, obtaining the mapping from the control plane.

Figure 12:
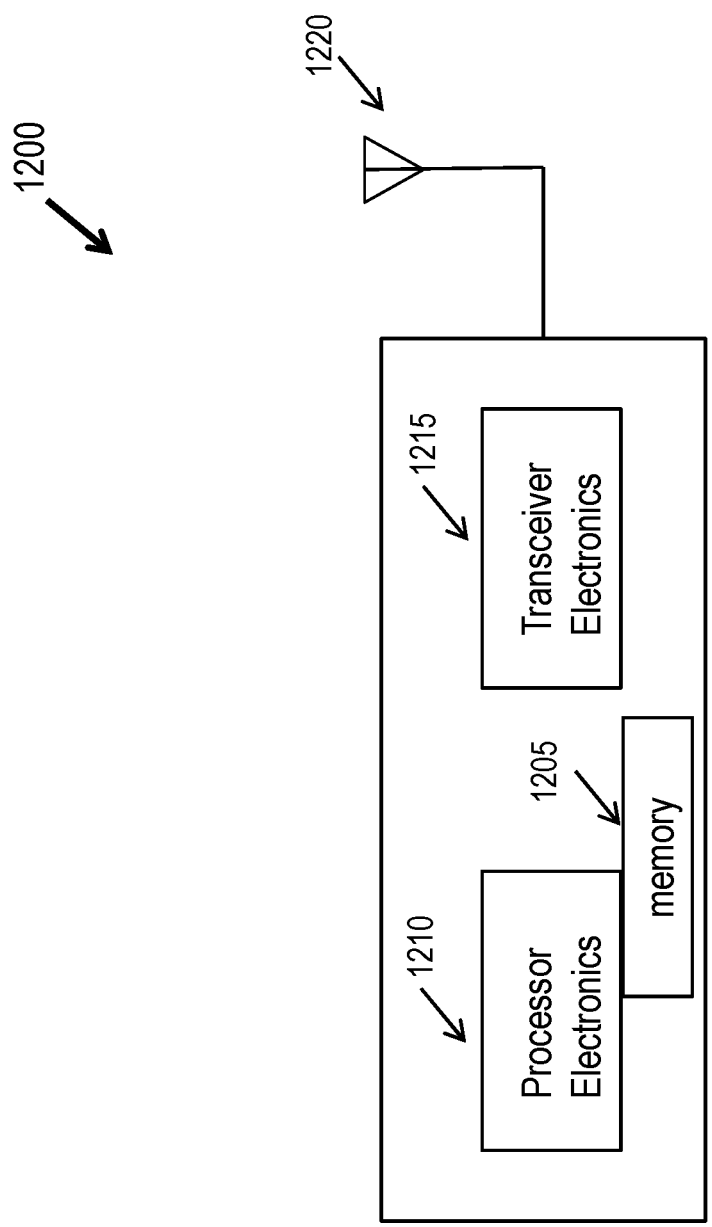
FIG. 12 is a block diagram of an example of a wireless communication apparatus.

FIG. 12 is a block diagram of an example implementation of a wireless communication apparatus 1200. The methods 700, 800, 900, 1000, and 1100 may be implemented by the apparatus 1200. In some embodiments, the apparatus 1200 may be a base station of a wireless network. The apparatus 1200 includes one or more processors, e.g., processor electronics 1210, transceiver circuitry 1215 and one or more antenna 1220 for transmission and reception of wireless signals. The apparatus 1200 may include memory 1205 that may be used to store data and instructions used by the processor electronics 1210. The apparatus 1200 may also include an additional network interface to a core network or a network operator's additional equipment. This additional network interface, not explicitly shown in FIG. 12, may be wired (e.g., fiber or Ethernet) or wireless.

Figure 13:
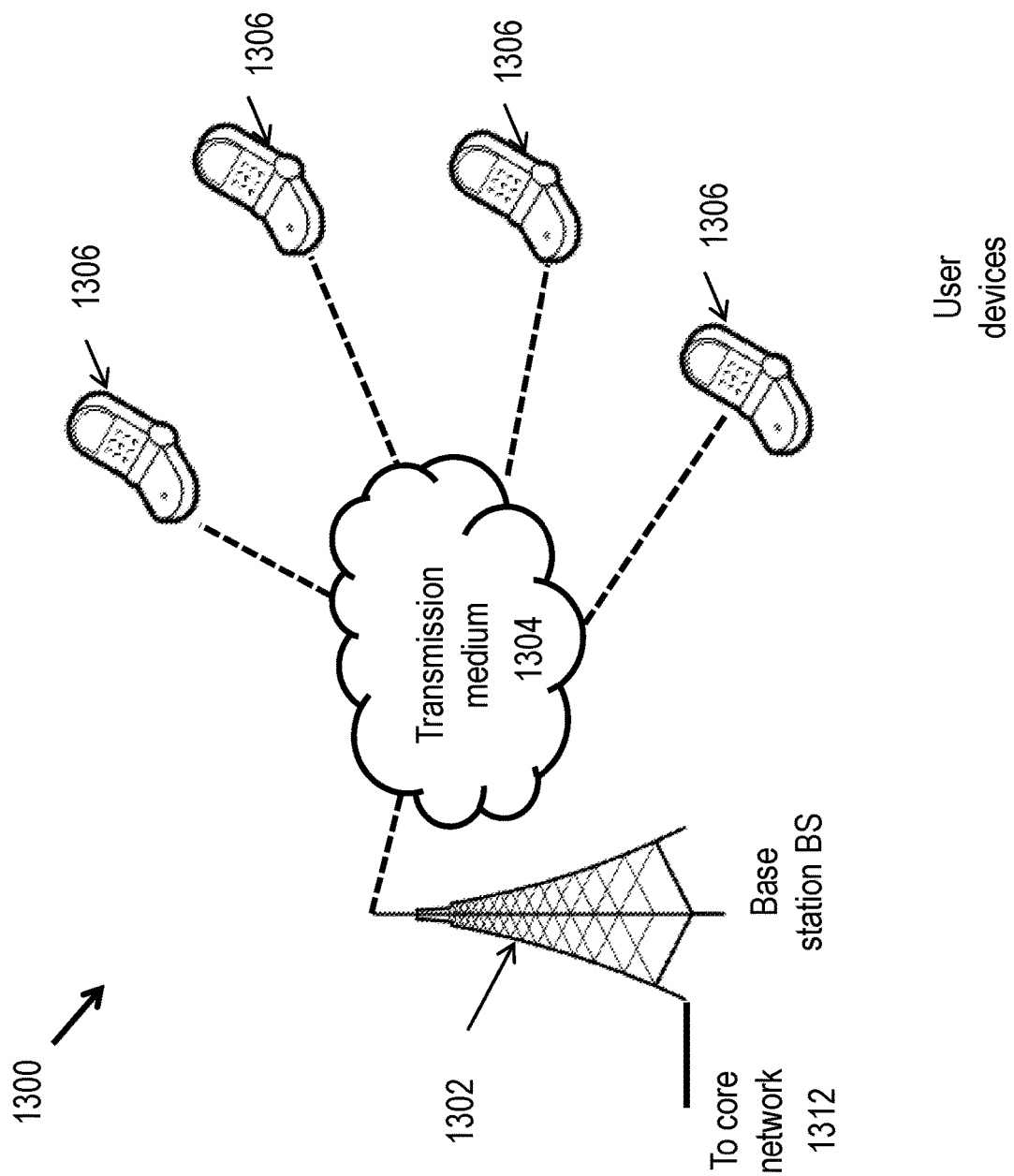
FIG. 13 shows an example wireless communications network.

FIG. 13 depicts an example of a wireless communication system 1300 in which the various techniques described herein can be implemented. The system 1300 includes a base station 1302 that may have a communication connection with core network (1312) and to a wireless communication medium 1304 to communicate with one or more user devices 1306. The user devices 1306 could be smartphones, tablets, machine to machine communication devices, Internet of Things (IoT) devices, and so on.

It will be appreciated that technique that provide the operation of data flows managed by a base station that has a separate user plan and a separate control plan are disclosed.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A wireless communication method, comprising:
   receiving, by a control plane of a base station from a user plane of the base station, a request message that requests the control plane to determine a mapping relationship between a quality of service (QOS) flow and a data radio bearer (DRB) in an uplink direction from a communication device to the base station; and
   transmitting, by the control plane of the base station to the user plane of the base station, a response message that includes the mapping relationship between one or more uplink QoS flows and the DRB,
      wherein a first QoS flow is associated with a quality of service flow identifier (QFI) included in an uplink packet received from the communication device, and
      wherein the request message is received in response to the first QoS flow not having a corresponding uplink direction QoS flow to DRB mapping relationship.

2. The method of claim 1, wherein the response message includes an indication that indicates that an access stratum (AS) reflective function is to be used by the user plane of the base station.

3. The method of claim 1, wherein the mapping relationship between the one or more uplink QoS flows to the DRB is determined by the control plane of the base station.

4. A communication apparatus comprising a processor configured to cause the communication apparatus to implement a method, comprising:
   receive, by a control plane of a base station from a user plane of the base station, a request message that requests the control plane to determine a mapping relationship between a quality of service (QOS) flow and a data radio bearer (DRB) in an uplink direction from a communication device to the base station; and
   transmit, by the control plane of the base station to the user plane of the base station, a response message that includes the mapping relationship between one or more uplink QoS flows and the DRB,
      wherein a first QoS flow is associated with a quality of service flow identifier (QFI) included in an uplink packet received from the communication device, and
      wherein the request message is received in response to the first QoS flow not having a corresponding uplink direction QoS flow to DRB mapping relationship.

5. The communication apparatus of claim 4, wherein the response message includes an indication that indicates that an access stratum (AS) reflective function is to be used by the user plane of the base station.

6. The communication apparatus of claim 4, wherein the mapping relationship between the one or more uplink QoS flows to the DRB is determined by the control plane of the base station.

7. A non-transitory computer readable program storage medium having code stored thereon, the code, when executed by a processor, causing the processor to implement a method, comprising:
   receiving, by a control plane of a base station from a user plane of the base station, a request message that requests the control plane to determine a mapping relationship between a quality of service (QOS) flow and a data radio bearer (DRB) in an uplink direction from a communication device to the base station; and
   transmitting, by the control plane of the base station to the user plane of the base station, a response message that includes the mapping relationship between one or more uplink QoS flows and the DRB,
      wherein a first QoS flow is associated with a quality of service flow identifier (QFI) included in an uplink packet received from the communication device, and
      wherein the request message is received in response to the first QoS flow not having a corresponding uplink direction QoS flow to DRB mapping relationship.

8. The non-transitory computer readable program storage medium of claim 7, wherein the response message includes an indication that indicates that an access stratum (AS) reflective function is to be used by the user plane of the base station.

9. The non-transitory computer readable program storage medium of claim 7, wherein the mapping relationship between the one or more uplink QoS flows to the DRB is determined by the control plane of the base station.

* * * * *